United States Patent
Kinoshita

[11] Patent Number: 6,045,139
[45] Date of Patent: Apr. 4, 2000

[54] SEALING SYSTEM FOR METAL GASKET AND GASKET ATTACHING PORTIONS

[75] Inventor: Yuuichi Kinoshita, Utsunomiya, Japan

[73] Assignee: Ishiwara Gasket Co., Ltd., Tokyo, Japan

[21] Appl. No.: 09/038,702

[22] Filed: Mar. 9, 1998

[30] Foreign Application Priority Data

Mar. 18, 1997 [JP] Japan .................................. 9-064977

[51] Int. Cl.$^7$ ...................................................... F02F 11/00
[52] U.S. Cl. ............................................. 277/594; 277/604
[58] Field of Search .................................. 277/594, 595, 277/604, 605, 612, 614

[56] References Cited

U.S. PATENT DOCUMENTS

| | | | |
|---|---|---|---|
| 3,180,662 | 4/1965 | Parlasca et al. | 277/614 X |
| 4,452,462 | 6/1984 | Karr, Jr. | 277/614 X |
| 4,976,445 | 12/1990 | Udagawa | 277/595 |
| 5,221,097 | 6/1993 | Ishikawa et al. | 277/595 X |
| 5,275,139 | 1/1994 | Rosenquist . | |
| 5,671,930 | 9/1997 | Cho . | |

*Primary Examiner*—Anthony Knight
*Assistant Examiner*—Karlena D. Schwing
*Attorney, Agent, or Firm*—Kanesaka & Takeuchi

[57] ABSTRACT

A sealing system is formed of gasket attaching portions facing each other, and a metal gasket. Each gasket attaching portion has a hole to be sealed and a flat surface portion around the hole. When the gasket attaching portions are assembled, the holes and flat surface portions face each other. At least one of the gasket attaching portions has a depression around the hole. The metal gasket includes a main portion situated between the flat surface portions of the gasket attaching portions, and an enlarged hollow portion attached to the main portion and facing the depression. When the gasket is tightened between the gasket attaching portions, the enlarged hollow portion is disposed in the depression and compressed thereat to securely and resiliently seal around the holes of the gasket attaching portions.

13 Claims, 2 Drawing Sheets

SEALING SYSTEM FOR METAL GASKET AND GASKET ATTACHING PORTIONS

BACKGROUND OF THE INVENTION AND RELATED ART STATEMENT

The present invention relates to a sealing system for a metal gasket and gasket attaching portions thereof. The sealing system may be used for a general type of a gasket, but preferably, the gasket is used for an internal combustion engine as a cylinder head gasket, a manifold gasket and so on, and is especially useful for a thin gasket formed of one or two metal plates.

A gasket for the engine is installed between two engine parts, such as between a cylinder head and a cylinder block, between a cylinder head and a manifold, and so on, for sealing and connecting the engine parts. Since high pressure and temperature are applied to the gasket in the engine, a metal or metal laminate gasket has been used widely. In view of the weight and economy of the gasket, the gasket is made as thin as possible. Thus, the gasket may be formed of one or two metal plates.

In the metal or metal laminate gasket, in order to securely seal around a hole to be sealed, a metal plate is often provided with a bead and/or turning portion around the hole to thereby provide a high surface pressure thereat. A grommet nay be installed around the hole instead of or together with the bead.

The bead formed on the metal plate projects outwardly from the metal plate, and has a curved shape or flat sections with linear corners in a cross section. When the bead is compressed in use, a curved top portion or linear corners of the bead are compressed, so that the bead generally provides a linear contact, not area contact, and provides a high surface pressure in a small area.

In case the bead contacts another plate for forming the gasket, the high surface pressure formed on the bead is relatively widely spread. However, if the bead directly contacts a gasket attaching portion of the engine, the gasket attaching portion receives the high surface pressure directly and causes a trouble, such as forming depression or deformation of the gasket attaching portion.

For example, when the metal laminate gasket is formed, the thickness of the metal plate is 0.2–0.4 mm; the height of the bead is 0.15–0.5 mm; and the width of the bead is 0.3–2.0 mm. When the bead makes a linear contact, the width of the contact is limited to 0.2–0.5 mm. In a single metal plate gasket, the thickness of the metal plate is slightly increased. However, in any cases, when the engine is actuated and stopped, the gasket is heated and cooled repeatedly and cyclically, and the contact area changes gradually. Thus, the sealing ability of the bead is gradually reduced and degraded. Therefore, it is preferable to form a wide sealing area with the area contact, not the linear contact, in the metal gasket.

In U.S. Pat. No. 5,221,097, an engine and a gasket form a sealing system, wherein an annular groove is formed in the engine, and a bead formed in the gasket is disposed in the annular groove. The sealing system of the patent operates as intended, but there is a room to improve the sealing system.

Accordingly, one object of the present invention is to provide a sealing system for a gasket and gasket attaching portions, wherein the gasket can securely seal between the gasket attaching portions with a wide sealing area.

Another object of the invention is to provide a sealing system as stated above, which can be used for a thin metal gasket.

A further object of the invention is to provide a sealing system as stated above, which can be used for a variety of gaskets.

Further objects and advantages of the invention will be apparent from the following description of the invention.

SUMMARY OF THE INVENTION

A sealing system of the invention is formed of a metal gasket and gasket attaching portions facing each other for installing the gasket therebetween. The sealing system is especially useful for an internal combustion engine.

Each gasket attaching portion includes a hole to be sealed, and a flat surface portion around the hole. The holes and the flat surface portions face each other when the gasket attaching portions are assembled. At least one of the gasket attaching portions has a depression around the hole.

The gasket includes a main portion situated between the flat surface portions of the gasket attaching portions, and an enlarged hollow portion attached to the main portion and facing the depression. When the gasket is tightened between the gasket attaching portions, the enlarged hollow portion is disposed in the depression and compressed thereat to securely seal around the holes of the gasket attaching portions.

In the invention, since the enlarged hollow portion is compressed in the depression, the hollow portion deforms to make an area contact in the depression. Thus, the gasket can be securely sealed with the gasket attaching portions.

The hollow portion of the gasket includes an upper side extending upwardly from the main portion, and a lower side extending downwardly from the main portion. At least one of the upper and lower sides is disposed in the depression of the gasket attaching portion when the gasket is tightened.

The depression may be formed only in one of the gasket attaching portions. In this case, one of the upper and lower sides not located in the depression is compressed to provide a surface pressure on the flat surface portion when the gasket is tightened. On the other hand, both of the gasket attaching portions may have depressions, and the upper and lower sides of the hollow portion are disposed in the depressions when the gasket is tightened.

The depression may have a triangular shape with two inner linear or V-shape surfaces in a cross section. In this case, when the hollow portion is compressed in the depression, the upper or lower side of the hollow portion contacts the inner linear surfaces of the depression to provide area contacts thereat.

In the invention, the depression may be formed at a corner of an inner surface of the hole and the flat surface portion in each gasket attaching portion. The depressions face each other and contact elastically parts of the upper and lower sides of the hollow portion.

The gasket may be formed of one metal plate. Also, the gasket may be formed of first and second metal plates with curved portions near the hole. In this case, first and second beads may be formed to surround the curved portions, and the curved portions are connected together to form the hollow portion. The curved portions of the first and second metal plates extend in opposite directions, and the beads laminate and orient in the same directions.

DETAILED DESCRIPTION OF PREFERRED EMBODIMENTS

Figure 1:
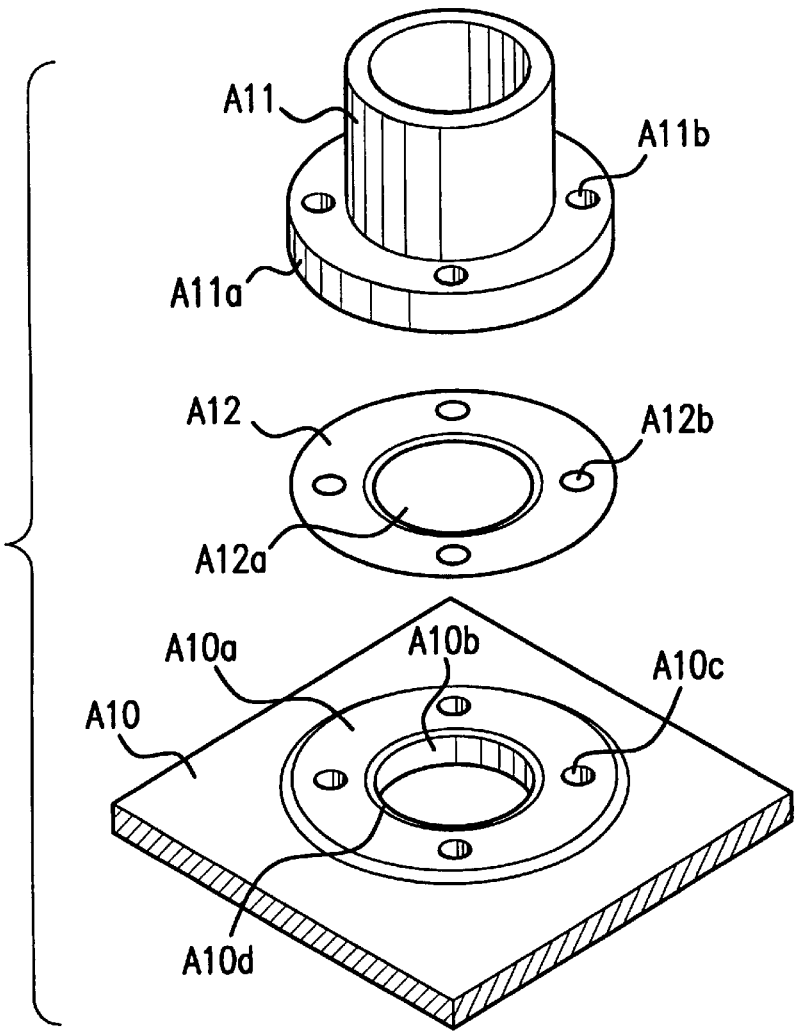
FIG. 1 is an exploded perspective view of engine parts with a gasket for showing a first embodiment of a sealing system of the invention.
Figure 2:
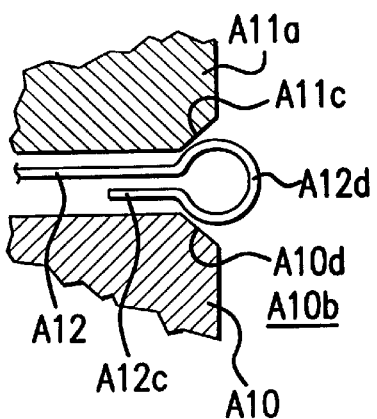
FIG. 2 is an explanatory sectional view of the first embodiment of the sealing system before a gasket held between gasket attaching portions is tightened.
Figure 3:
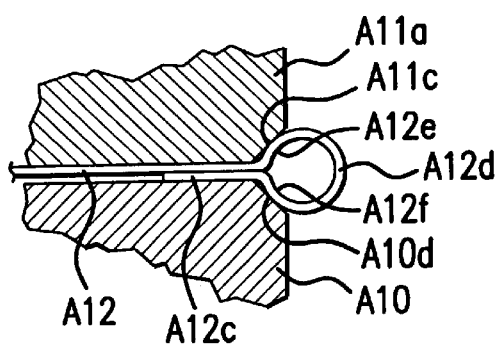
FIG. 3 is an explanatory sectional view of the first embodiment of the sealing system when the gasket held between the gasket attaching portions is tightened.

With reference to FIGS. 1–3, a first embodiment A of a sealing system of the invention is explained.

The sealing system A is formed of engine parts and a gasket held between the engine parts. The engine parts used in the embodiment A are a cylinder block A10 and an exhaust pipe A11 with a flange A11a. A gasket A12 is installed between the cylinder block A10 and the flange A11a of the exhaust pipe A11.

In particular, the cylinder block A10 includes a seat A10a, wherein an exhaust hole A10b and bolt holes A10c around the exhaust hole A10b are formed. The flange A11a of the exhaust pipe A11 includes bolt holes A11b. Also, the gasket A12 includes a central hole A12a and bolt holes A12b. When the sealing system A of the invention is assembled, the gasket A12 is held between the flange A11a and the seat A10a, and is tightened by bolts (not shown) passing through the bolt holes A10c, A11b, A12b.

As shown in FIGS. 2 and 3, the cylinder block A10 includes an inclined portion A10d at a corner around the exhaust hole A10b. Also, the flange A11a of the exhaust pipe A11 includes an inclined portion A11c. The inclined portions A10d, A11c extend all around the respective holes and form contact surfaces. An angle between the inclined portions A10d, A11c is between 60 and 120 degrees.

The gasket A12 is formed of a single metal plate, and an inner edge A12c is turned to form a cylindrical sealing portion A12d with upper and lower sealing surfaces A12e, A12f, which has a resiliency when it is compressed. The outer diameter of the cylindrical sealing portion A12d is slightly larger than the inclined portions A10d, A11c when the gasket A12 is disposed between the cylinder block A10 and the flange A11a, as shown in FIG. 2.

When the gasket A12 held between the flange A11a and the seat A10a is tightened by bolts, the sealing surfaces A12e, A12f are pushed radially inwardly toward the center of the exhaust hole A10b by the inclined portions A10d, A11c. As a result, the cylindrical shape of the sealing portion A12d is deformed such that the sealing surfaces A12e, A12f become flat along the inclined portions A10d, A11c, as shown in FIG. 3. Namely, the inclined portions A10d, A11c engage the sealing portion A12d as area contacts, so that the sealing pressures are widely equally applied onto the inclined portions A10d, A11c, not by linear contacts. Thus, the gasket can securely seal between the cylinder block A10 and the exhaust pipe A11 without applying large pressure at one portion.

In this sealing condition, since the sealing portion A12d keeps the sufficient resiliency, the sealing can be well maintained. Leakage does not occur even if the exhaust pipe expands or contracts by heat.

Figure 4:
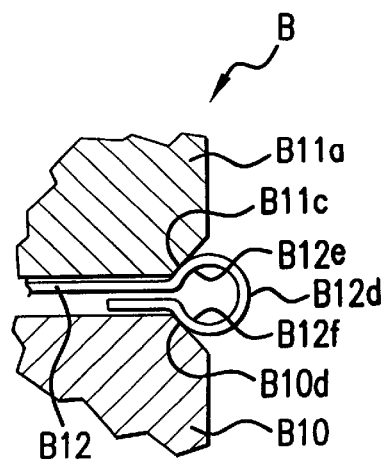
FIG. 4 is an explanatory sectional view, similar to FIG. 2, of a second embodiment of the sealing system.

FIG. 4 is a second embodiment B of the sealing system of the invention. The sealing system B includes a cylinder block B10 with an inclined portion B10d, an exhaust pipe with a flange B11a and an inclined portion B11c, and a gasket B12 with a cylindrical sealing portion B12d and sealing surfaces B12e, B12f, similar to the sealing system A. In the sealing system B, the sealing portion B12d has an oblong circular shape in a cross section, such that a part of the sealing portion B12d projecting inwardly into an exhaust hole is reduced. The sealing system B operates as in the sealing system A.

Figure 5:
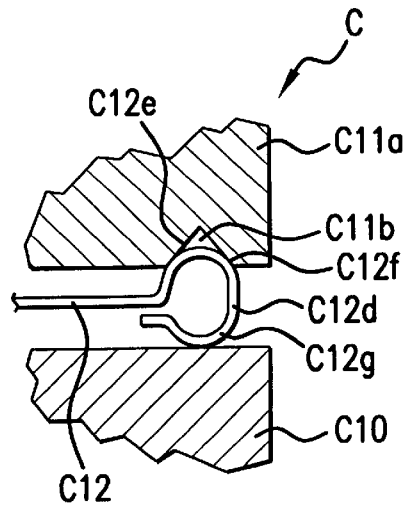
FIGS. 5–7 are explanatory sectional views, similar to FIG. 2, of third to fifth embodiments of the sealing system of the invention.

FIG. 5 shows a third embodiment C of the sealing system of the invention. The sealing system C includes a cylinder block C10, an exhaust pipe with a flange C11a, and a gasket C12 with a cylindrical sealing portion C12d, similar to the sealing system A. In the sealing system C, however, the cylinder block C10 does not have an inclined portion, and instead, the flange C11a includes a V-shape notch C11b around the exhaust hole.

When the gasket C12 is tightened between the cylinder block C10 and the exhaust pipe, upper curved portions C12e, C12f of the sealing portion C12d contact the surfaces of the V-shape notch C11b and are compressed. Thus, the upper curved portions C12e, C12f deform to closely contact the surfaces of the V-shape notch C11b to securely seal thereat. Since a lower portion C12g of the sealing portion C12d contacts the cylinder block C10, the sealing portion C12d can provide resilient surface pressures to both cylinder block C10 and the flange C11a of the exhaust pipe. The gasket C12 can securely seal between the cylinder block and the exhaust pipe.

Figure 6:
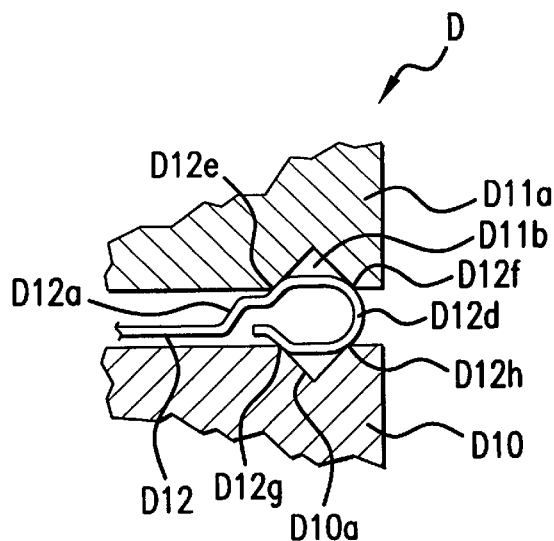

FIG. 6 shows a fourth embodiment D of the sealing system of the invention. The sealing system D includes a cylinder block D10, an exhaust pipe with a flange D11a and a V-shape notch D11b, and a gasket D12 with a cylindrical sealing portion D12d, similar to the sealing system C. In the sealing system D, the cylinder block D10 includes a V-shape notch D10a under the V-shape notch D11b, and also the gasket D12 has an inclined step portion D12a outside the sealing portion D12d.

When the gasket D12 is tightened between the cylinder block D10 and the exhaust pipe, upper curved portions D12e, D12f of the sealing portion D12d contact the surfaces of the V-shape notch D11b and are compressed, and also, lower curved portions D12g, D12h contact the surfaces of the V-shape notch D10a and are compressed. Thus, the upper curved portions D12e, D12f deform to closely contact the surfaces of the V-shape notch D11b, and the lower curved portions D12g, D12h deform to closely contact the surfaces of the V-shape notch D10a. At this time, the step portion D12a is also compressed to resiliently seal around the notches D10a, D10b. The gasket D12 can securely seal between the cylinder block and the exhaust pipe.

Figure 7:
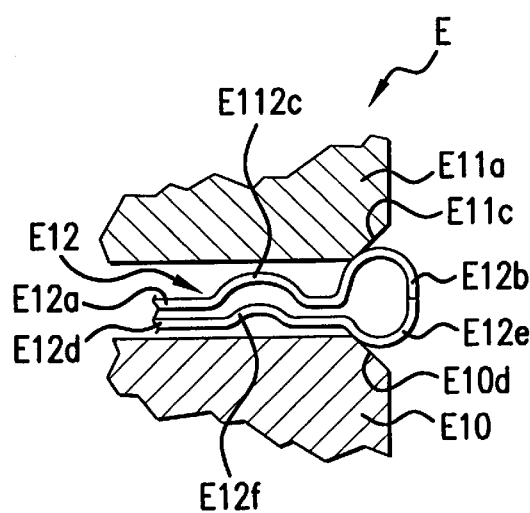
Figure 4:
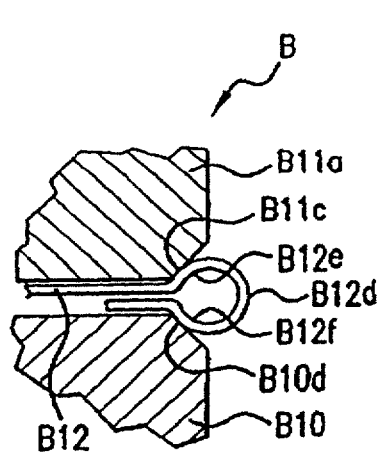
Figure 5:
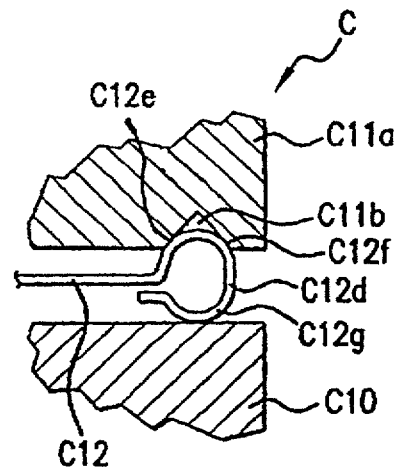
Figure 6:
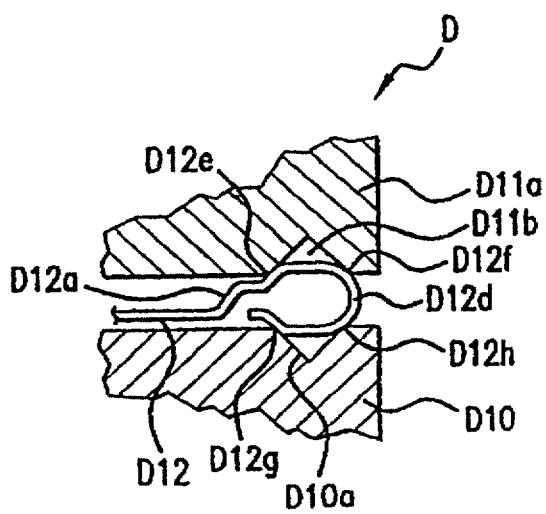
Figure 7:
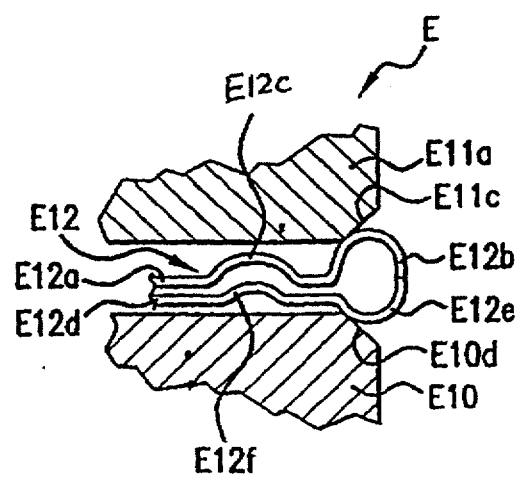

FIG. 7 is a fifth embodiment E of the sealing system of the invention. The sealing system F includes a cylinder block E10 with an inclined portion E10d, an exhaust pipe with a flange E11a and an inclined portion E11c, and a gasket E12, similar to the sealing system A. In the sealing system E, the gasket E12 is formed of an upper plate E12a with a curved portion E12b and a bead E12c, and a lower plate E12d with a curved portion E12e and a bead E12f. The curved portions E12b, E12e are connected together to form a cylindrical sealing portion. The beads E12c, E12f are laminated together to mainly locate the gasket E12 on the proper position between the cylinder block E10 and the exhaust pipe. The beads E12c, E12f also seal around the exhaust hole.

When the gasket E12 is situated between the cylinder block E10 and the exhaust pipe and is tightened, the beads E12c, E12f are compressed to immovably locate the gasket between the cylinder block E10 and the exhaust pipe. As the gasket E12 is tightened, the curved portions E12b, E12e contact the inclined portions E11c, E10d, respectively, and deform as in the gasket A12. The gasket E12 can securely seal between the cylinder block E10 and the exhaust pipe by the curved portions E12b, E12e and the beads E12c, E12f.

In the sealing system of the invention, the metal gasket is situated between the gasket attaching portions, and the cylindrical sealing portion or hollow portion of the gasket is held in a groove or inclined portion of the gasket attaching portion to form an area contact. Thus, the gasket can securely seal between the gasket attaching portions. The gasket does not provide a huge local pressure to the gasket attaching portions, and can provide a resilient sealing pressure.

While the invention has been explained with reference to the specific embodiments of the invention, the explanation is illustrative and the invention is limited only by the appended claims.

What is claimed is:

1. A sealing system for a gasket, comprising:

gasket attaching portions facing each other, each of said gasket attaching portions having a hole with an inner surface to be sealed and a flat surface portion around the hole, and being arranged such that said holes and flat surface portions face each other when the gasket attaching portions are assembled, at least one of said gasket attaching portions having a depression around the hole at an edge portion where the flat surface portion and the inner surface of the hole intersect, and a metal gasket including a main portion situated between the flat surface portions of the gasket attaching portions, and an enlarged hollow portion attached to the main portion and situated in the depression so that when the gasket is tightened between the gasket attaching portions, the enlarged hollow portion is disposed in the depression and compressed thereat to be pulled radially inwardly to a center of the exhaust hole to thereby securely seal around the holes of the gasket attaching portions.

2. A sealing system according to claim 1, wherein said hollow portion of the gasket includes an upper side extending upwardly from the main portion and a lower side extending downwardly from the main portion, at least one of the upper and lower sides being disposed in the depression of the gasket attaching portion when the gasket is tightened.

3. A sealing system according to claim 2, wherein both of said gasket attaching portions have depressions, and the upper and lower sides of the hollow portion are disposed in the depressions when the gasket is tightened.

4. A sealing system according to claim 2, wherein said depression is formed in each gasket attaching portion, said depressions facing each other and contacting parts of the upper and lower sides of the hollow portion.

5. A sealing system according to claim 4, wherein said depressions have linear surfaces in a vertical cross section, to which the parts of the upper and lower sides of the hollow portion elastically contact to seal thereat.

6. A sealing system according to claim 4, wherein said gasket is formed of first and second metal plates with curved portions near the hole, and first and second beads surrounding the curved portions, said curved portions being connected together to form the hollow portion.

7. A sealing system according to claim 6, wherein said curved portions of the first and second metal plates extend in opposite directions, and the beads laminate and orient in same directions.

8. A sealing system according to claim 1, wherein said metal gasket is formed of one metal plate, and includes an inner edge extending from the enlarged hollow portion and situated under the main portion, said enlarged hollow portion having upper and lower curved portions contacting the depression and being partly located in the hole.

9. A sealing system for a gasket, comprising:

gasket attaching portions facing each other, each of said gasket attaching portions having a hole with an inner surface to be sealed and a flat surface portion around the hole, and being arranged such that said holes and flat surface portions face each other when the gasket attaching portions are assembled, at least one of said gasket attaching portions having a first depression extending from the flat surface portion to surround the hole, and one metal plate for forming a gasket situated between the flat surface portions of the gasket attaching portions and including a main portion, an enlarged hollow portion extending from the main portion and situated adjacent to the hole, and an inner edge extending from the enlarged hollow portion and situated under the main portion, said enlarged hollow portion having upper curved portions spaced apart from each other and lower curved portions spaced apart from each other so that when the gasket is tightened between the gasket attaching portions, the upper curved portions are disposed in the first depression and compressed thereat to securely seal around the holes of the gasket attaching portions.

10. A sealing system according to claim 9, wherein said first depression is formed only in one of said gasket attaching portions, the lower curved portions not located in the depression being compressed to provide a surface pressure on the flat surface portion when the gasket is tightened.

11. A sealing system according to claim 9, wherein said first depression has a triangular shape with two inner surfaces in a cross section so that when the upper curved portions of the hollow portion are compressed in the depression, the upper curved portions contact the inner surfaces of the depression widely.

12. A sealing system according to claim 9, wherein the gasket attaching portion facing the gasket attaching portion with the first depression is flat without a depression so that when the gasket is tightened, the lower curved portions contact the flat surface portion without the depression to provide resiliency to both gasket attaching portions.

13. A sealing system according to claim 9, wherein the gasket attaching portion facing the gasket attaching portion with the first depression has a second depression facing the first depression, said lower curved portions being disposed in the second depression, said main portion having a stepped portion to surround the hollow portion, said stepped portion providing a surface pressure around the hollow portion.

* * * * *

UNITED STATES PATENT AND TRADEMARK OFFICE
CERTIFICATE OF CORRECTION

PATENT NO. : 6,045,139
DATED : April 4, 2000
INVENTOR(S) : Yuuichi Kinoshita

It is certified that error appears in the above-identified patent and that said Letters Patent is hereby corrected as shown below:

Title page
Item 73 change "Ishiwara" to --Ishikawa--;

Column 4
Line 50, change "D10b" to --D11b--;
Line 53, change "F" to --E--;

Figure 5, change a lead line as shown in red in the attached copy thereof; and
Figure 7, change a numeral "E112c" to --E12c-- as shown in red in the attached copy thereof.

Signed and Sealed this

Third Day of July, 2001

*Attest:*

*Attesting Officer*

NICHOLAS P. GODICI
*Acting Director of the United States Patent and Trademark Office*